United States Patent [19]

Umezaki et al.

[11] Patent Number: 5,141,807

[45] Date of Patent: Aug. 25, 1992

[54] MAGNETIC RECORDING MEDIUM

[75] Inventors: Hiroshi Umezaki; Yoshiaki Takeuchi, both of Niihama, Japan

[73] Assignee: Sumitomo Chemical Company, Limited, Osaka, Japan

[21] Appl. No.: 539,687

[22] Filed: Jun. 18, 1990

[30] Foreign Application Priority Data

Jun. 19, 1989 [JP] Japan ................... 1-156081

[51] Int. Cl.$^5$ .............................................. G11B 23/00
[52] U.S. Cl. .................................... 428/329; 428/402; 428/403; 428/694; 428/900
[58] Field of Search ............... 428/402, 403, 329, 694, 428/900

[56] References Cited

U.S. PATENT DOCUMENTS

| | | |
|---|---|---|
| 4,671,993 | 6/1987 | Kadokura et al. . |
| 4,741,952 | 5/1988 | Aoyama et al. ............ 428/694 |
| 4,756,962 | 7/1988 | Takamatsu et al. . |
| 4,818,608 | 4/1989 | Furuyama et al. ............ 428/694 |
| 4,820,581 | 4/1989 | Saito et al. ............ 428/694 |
| 4,837,083 | 6/1989 | Kuroda et al. . |
| 4,847,156 | 7/1989 | Nishikawa et al. ............ 428/694 |
| 4,871,606 | 10/1989 | Matsuura et al. ............ 428/694 |
| 4,913,959 | 4/1990 | Miyako et al. ............ 428/694 |
| 4,917,947 | 4/1990 | Kosha et al. ............ 428/403 |

FOREIGN PATENT DOCUMENTS

| | | |
|---|---|---|
| 58-1592369 | 9/1983 | Japan . |
| 61-042730 | 3/1986 | Japan . |
| 62-001117 | 1/1987 | Japan . |
| 62-095730 | 5/1987 | Japan . |
| 63-074119 | 4/1988 | Japan . |
| 63-239616 | 10/1988 | Japan . |
| 2055394 | 5/1978 | United Kingdom . |

OTHER PUBLICATIONS

Chemical Abstracts, (1980) vol. 92, Abstract No. 134058H, p. 330.
Chemical Abstracts, (1988) vol. 108, Abstract No. 80693q, p. 345.
Chemical Abstracts, (1986) vol. 104, Abstract No. 154468M, p. 347.

*Primary Examiner*—Paul J. Thibodeau
*Assistant Examiner*—Leszek Kiliman
*Attorney, Agent, or Firm*—Birch, Stewart, Kolasch and Birch

[57] . ABSTRACT

A magnetic recording medium comprising a non-magnetic substrate and a magnetic layer which comprises magnetic powder, a binder and alumina powder having an average primary particle size of not larger than 0.3 μm and containing at least one oxide selected from the group consisting of oxides of silicon, magnesium, lanthanum and zirconium in an amount of 0.05 to 5 parts by weight per 100 parts by weight of alumina, which medium has improved durability, abrasion resistance and surface smoothness of a magnetic layer and good cleaning effect on a magnetic head.

11 Claims, No Drawings

MAGNETIC RECORDING MEDIUM

BACKGROUND OF THE INVENTION

1. Field of the Invention

The present invention relates to a magnetic recording medium. More particularly, the present invention relates to a magnetic recording medium having improved durability, abrasion resistance and surface smoothness of a magnetic layer and good cleaning effect on a magnetic head.

2. Description of the Related Art

A magnetic recording medium such as a magnetic tape, a magnetic disc and a magnetic sheet is now widely used for audio use, video recording use and computer use.

To a magnetic layer of such magnetic recording medium, non-magnetic powder such as $Al_2O_3$, $Cr_2O_3$, SioC or $\alpha\text{-}Fe_2O_3$ is added as a reinforcing material or an abrasive to increase durability and abrasion resistance of the magnetic layer or to clean foreign particles adhered to the magnetic head.

To this end, the non-magnetic powder having an average particle size of about 0.5 $\mu m$ is added to the magnetic layer. Recently, to increase a recording density, metal magnetic powder or fine particle iron oxide magnetic powder is used, and it is required to increase the surface smoothness and electromagnetic conversion characteristics of the magnetic recording medium. When the conventional non-magnetic powder is used, since it has a larger particle size than the magnetic powder, the electromagnetic conversion characteristics is deteriorated and the surface smoothness is worsened, and the abrasion or wear of the magnetic head is increased.

To overcome such drawbacks, it may be contemplated to use non-magnetic powder having a very small particle size of, for example, 0.4 $\mu m$ or less. However, the non-magnetic powder having a very small particle size does not greatly contribute to the improvement of the durability and abrasion resistance of the magnetic layer, or has small cleaning effect on the magnetic head.

To improve such defects, it was proposed to use inorganic powder having an average primary particle size of 0.35 $\mu m$ or less, an angle of repose of 40 degrees or larger and Mohs' hardness of 5 or larger (cf. Japanese Patent Kokai Publication No. 104427/1986), angular $\alpha\text{-}Al_2O_3$ 0.1 to 0.3 $\mu m$ in average particle size and having an alpha-alumina content of at least 50 % in the crystal (cf. Japanese Patent Kokai Publication No. 250518/1987) or angular $\alpha\text{-}Al_2O_3$ having an average particle size of a half or less of that of the magnetic powder and less than 0.1 $\mu m$ (cf. Japanese Patent Kokai Publication No. 74118/1988).

Although these proposed inorganic powders can improve the cleaning effect due to their angular shape, they cannot improve the durability and abrasion resistance of the magnetic layer of the magnetic recording medium for high density recording which utilizes metal magnetic powder or fine particle iron oxide magnetic powder.

There was proposed a magnetic recording medium in which particles of inorganic powder such as $Al_2O_3$ are coated with chromium oxide, iron oxide, zinc oxide, titanium oxide or vanadium oxide or a mixture of such oxide and other material and used in the magnetic layer to improve the surface smoothness and electromagnetic conversion characteristics (cf. Japanese Patent Kokai Publication Nos. 159236/1983 and 239616/1988). However, such coated powder has decreased abrasion effect and cannot achieve the desired magnetic head cleaning effect since the surface hardness of $Al_2O_3$ may be hindered by the coating.

SUMMARY OF THE INVENTION

An object of the present invention is to provide a magnetic recording medium which has good electromagnetic conversion characteristics and surface smoothness of the magnetic layer and also good durability, abrasion resistance and magnetic head cleaning effect.

According to the present invention, there is provided a magnetic recording medium comprising a non-magnetic substrate and a magnetic layer which comprises magnetic powder, a binder and alumina powder having an average primary particle size of not larger than 0.3 $\mu m$ and containing at least one oxide selected from the group consisting of oxides of silicon, magnesium, lanthanum and zirconium in an amount of 0.05 to 5 parts by weight per 100 parts by weight of alumina.

DETAILED DESCRIPTION OF THE INVENTION

Alumina ($Al_2O_3$) to be used in the present invention has an average primary particle size of not larger than 0.3 $\mu m$ and contains at least one oxide selected from the group consisting of oxides of silicon (Si), magnesium (Mg), lanthanum (La) and zirconium (Zr) in an amount of 0.05 to 5 parts by weight, preferably 0.07 to 4 parts by weight per 100 parts by weight of alumina. That is, the oxide-containing alumina to be used in the present invention is alumina in the crystal of which the oxide is present in the solid solution state or the oxide is dispersed, but does not include a mixture of alumina and the oxide or alumina particle surfaces of which are simply coated with the oxide.

When the alumina particles are coated with the oxide, the abrasion effect of alumina is deteriorated and sufficient magnetic head cleaning effect is not achieved since the hardness of alumina may be hindered by the oxide. A mere mixture of alumina and the oxide cannot give the desired magnetic recording medium having good electromagnetic conversion characteristics and improved traveling durability, abrasion resistance and magnetic head cleaning effect.

The oxide-containing alumina to be used in the present invention may be prepared by a per se conventional method. For example, in a solution of aluminum halogenide (e.g. aluminum chloride) or an aluminum salt (e.g. aluminum sulfate, aluminum nitrate, aluminum perchlorate and ammonium alum), a compound which can be converted to the oxide through calcination is homogeneously mixed, an aluminum compound is formed by a neutralization method or a recrystallization method or by precipitation aluminum carbonate with ammonium hydrogencarbonate, and then the aluminum compound is calcined.

Alternatively, a compound which is converted to the oxide through calcination is homogeneously mixed with a solution of an organoaluminum compound to form the aluminum compound through hydroysis and the formed aluminum compound is calcined. Examples of the organoaluminum compound are aluminum alkoxides (e.g. aluminum methoxide, aluminum ethoxide, aluminum isopropoxide, etc.), alkylaluminum (e.g. trimethylaluminum, triethylaluminum, etc.), aluminum carboxylates and aluminum dicarboxylates.

Further, with the aluminum compounds prepared from the above aluminum salt by neutralization or recrystallization or by precipitating a carbonate with ammonium hydrogen carbonate, or the aluminum compound prepared by hydrolyzing or pyrolyzing the organoaluminum compound, at least one oxide of a metal selected from the group consisting of Si, Mg, La and Zr or the compound which can be converted to the metal oxide by calcination is mixed in a wet or dry state and then the mixture is calcined to produce the oxide-containing alumina.

In any method, the calcination conditions include a temperature of about 1100° C. to about 1400° C. and a calcination time of about one hour to about four hours.

The state of the oxide component to be mixed may be any one which finally gives the oxide and includes a solution containing the corresponding element, fine particle metal, fine particle metal oxide and fine particle metal hydroxide.

Examples of the compound which can be converted to the oxide by calcination are silicon-containing compounds such as orthosilicic acid esters, silane coupling agents, silylating agents (e.g. chlorosilane, ester silane, silazane, etc.), silicon halide (e.g. silicon chloride) and silicone compounds; magnesium-containing compounds such as magnesium halides (e.g. magnesium chloride, etc.), magnesium perchlorate, magnesium sulfate, magnesium nitrate, magnesium carbonate, and magnesium alkoxides (e.g. magnesium methoxide, magnesium ethoxide, magnesium isopropoxide, etc.); zirconium-containing compounds such as zirconium halides (e.g. zirconium chloride, etc.), zirconium oxyhalides (e.g. zirconium oxychloride, etc.), zirconium sulfate, zirconium nitrate, zirconium alkoxides (e.g. zirconium methoxide, zirconium ethoxide, zirconium isopropoxide, etc.), zirconium carboxylates, zirconium dicarboxylates and zirconium coupling agents; lanthanum-containing compounds such as lanthanum halides (e.g. lanthanum chloride, etc.), lanthanum nitrate, lanthanum sulfate, lanthanum carbonate, lanthanum alkoxides (e.g. lanthanum methoxide, lanthanum ethoxide, lanthanum propoxide, etc.), lanthanum carboxylates and lanthanum dicarboxylates.

When the content of the oxide in the alumina powder is less than about 0.05 part by weight per 100 parts by weight of alumina, sufficient durability cannot be achieved since alumina powder may have fewer active sites which have affinity with the binder. When the content of the oxide in the alumina is larger than about 5 parts by weight per 100 parts by weight of alumina, the hardness of alumina is undesirably decreased.

The alumina powder to be used in the present invention has an average primary particle size of not larger than about 0.3 $\mu$m, preferably from about 0.05 to 0.25 $\mu$m. When the average primary particle size is larger than about 0.3 $\mu$m, the surface smoothness or the electromagnetic conversion performance is deteriorated.

When the particle size is too small, it is difficult to disperse the alumina powder in the solvent. If the dispersion of the alumina powder is insufficient, the surface smoothness is deteriorated or the reinforcing effect is insufficient.

An amount of the oxide-containing alumina powder to be added to the magnetic powder is generally from about 0.1 to about 15 % by weight, preferably from about 0.5 to about 10 % by weight based on the weight of the magnetic powder. When the amount of the oxide-containing alumina powder is less than about 0.1 % by weight, the durability and abrasion resistance of the magnetic layer are decreased. When said amount is larger than about 15 % by weight, the worn amount of the magnetic head increases.

In the present invention, any of the conventional magnetic powder can be used. Examples of the magnetic powder are oxide type magnetic powder such as $\gamma$-Fe$_2$O$_3$ powder, cobalt-containing $\gamma$-Fe$_2$O$_3$ powder, cobalt-coated $\gamma$-Fe$_2$O$_3$ powder, Fe$_3$O$_4$ powder, cobalt-containing Fe$_3$O$_4$ powder, cobalt-coated Fe$_3$O$_4$ powder and CrO$_2$ powder; and magnetic metal powder comprising magnetic metal (e.g. iron, nickel and cobalt) such as Fe powder, Ni powder, Co powder, Fe-Ni alloy powder, Fe-Co alloy powder, Fe-Ni-P alloy powder, Fe-Ni-Co alloy powder, Fe-Mn-Zn alloy powder, Fe-Ni-Zn alloy powder, Fe-Co-Ni-Cr alloy powder, Fe-Co-Ni-P alloy powder, Co-Ni alloy powder, Co-P alloy powder and Co-Cr alloy powder.

The particle size, namely the average primary particle size of the magnetic powder is not critical. It is usually from about 0.05 to about 5 $\mu$m.

The metal magnetic powder may contain conventionally used additives such as elements (e.g. Si, Cu, Zn, Al, P, Mn and Cr) or their compounds.

The magnetic powder may contain hexagonal system ferrite such as barium ferrite, or iron nitride.

The binder may be any of the conventionally used ones such as thermoplastic resins, thermosetting resins, reactive resins, electron beam-curing resins and their mixtures. Specific examples of the binder resins are urethane resins, epoxy resins, urea resin, amide resins, silicone resins, polyester resins, phenol resins, vinyl resins, cellulose derivatives, rubber base resins and their copolymers or blends.

Examples of a material used to form the non-magnetic substrate are plastics such as polyesters (e.g. polyethylene terephthalate, polyethylene naphthalate, etc.), polyolefins (e.g. polypropylene, etc.), cellulose derivatives (e.g. cellulose triacetate, cellulose diacetate, etc.), vinyl resins (e.g. polyvinyl chloride, etc.), polycarbonate, polyamide and polysulfon; metals such as aluminum and copper; and ceramics such as glass.

The magnetic recording medium of the present invention can be produced by a per se conventional method. For example, the magnetic powder, the binder resin and the oxide-containing alumina are mixed and dispersed in an organic solvent together with the additives to prepare a magnetic paint. Then, the magnetic paint is coated on a surface of the non-magnetic substrate, dried and optionally heat treated and surface treated.

PREFERRED EMBODIMENTS OF THE INVENTION

The present invention will be illustrated by following Examples, in which "parts" are by weight unless otherwise indicated.

In Examples, the properties of the magnetic recording medium are measured and evaluated as follows:

SURFACE GLOSS

Total reflectance is measured with a standard gloss meter at an angle of incident of 60° and an angle of reflection of 60° on a sample recording tape and a relative value of the measured total reflectance to that on a glass plate having a reflective index of 1.56 is calculated (the reflectance of the latter being 100).

STILL CHARACTERISTICS

With a video deck which is modified to measure still, a signal at 4 MHz is recorded on a sample recording tape and reproduced at a stopped position at 25° C., 60 %RH under back tension of 40 g. Then, a time in which the reproducing output decreases to a half of the original value is measured.

CONTAMINATION AND ABRASION OF MAGNETIC HEAD

By using a video deck NV-G21 manufactured by Matsushita Industrial Co., Ltd., a sample recording tape is traveled at 40° C., 80 %RH for 100 hours. Then, contamination of the magnetic head is observed, and an abrased amount of the magnetic head is measured.

AVERAGE PRIMARY PARTICLE SIZE

From a scanning type electron microscopic photograph of the powder, particle sizes (average values of major and minor axes) are read, and from the read values, a cumuparticle size determined from this curve is used as an average primary particle size.

EXAMPLE 1

To a solution of aluminum isopropoxide in isopropanol, a large excess amount of water was added to hydrolyze the former. Then, to the mixture, ethyl silicate was added and homogeneously mixed. After distilling off the solvent, the residue was calcined at 1250° C. for 3 hours to obtain alumina powder having an average primary particle size of 0.2 μm and containing 0.1 part of $SiO_2$.

Five parts of this alumina powder was mixed with the following components to prepare a magnetic paint: Component Parts

| Component | Parts |
| --- | --- |
| Co-coated γ-$Fe_2O_3$ (B-42 manufactured by Titanium Industries) BET specific surface area: 43 m$^2$/g $H_c$ (coercive force): 780 Oe $\sigma_s$ (saturation magnetization): 65 Pmu/g Major axis: 0.25 μm Minor axis: 0.05 μm | 100 |
| Polyurethane resin (SB-0853 manufactured by Sumitomo Bayer Urethane) | 10 |
| Vinyl chloride/vinyl acetate/vinyl alcohol copolymer (MPR-TA5C manufactured by Nisshin Chemical) | 10 |
| Carbon black (Vulcan XC-72 manufactured by Cabot) | 4 |
| Butyl stearate | 1 |
| Methyl ethl ketone | 100 |
| Toluene | 100 |
| Cyclohexanone | 50 |
| Polyisocyanate curing agent (Sumidur L manufactured by Sumitomo Bayer Urethane). | 4 |

All the components were dispersed in a sand grinder for 5 hours and filtered through a filter of average o pore size of 1 μm. Then, the magnetic paint was coated on a polyethylene terephthalate film having a thickness of 10 μm so that a thickness after drying was 3 μm and dried to form a magnetic layer. After calendering, the magnetic layer was cured at 70° C. for 24 hours, and the film having the magnetic layer was cut to a width of 0.5 inch to produce a magnetic recording tape.

The surface gloss, still characteristics, and contamination and abrasion of the magnetic head were observed or measured as above. The results are shown in Table 1.

EXAMPLES 2-6 AND COMPARATIVE EXAMPLES 1-4

In the same manner as in Example 1 but using an additive shown in Table 2 and changing the sintering temperature to that in Table 2, alumina powder was prepared. Then, in the same manner as in Example 1, a magnetic recording tape was produced.

The characteristics of the tape are also shown in Table 1.

EXAMPLE 7

To an aqueous solution of ammonium alum, magnesium nitrate was added, and magnesium-containing ammonium alum was precipitated by recrystallization. The precipitate was calcined under the conditions of Table 2 to obtain alumina powder having the properties of Table 1.

In the same manner as in Example 1 but using the above alumina powder, a magnetic recording tape was produced. The characteristics of the tape are shown in Table 1.

COMPARATIVE EXAMPLE 5

High purity alumina having an average particle size of 0.2 μm (AKP-50 manufactured by Sumitomo Chemical Co., Ltd.) was dispersed in ethanol. To the dispersion, ethyl silicate was added and thoroughly mixed. Then, water was added to hydrolyze ethyl silicate and dried. The residue was calcined at 800° C. for 3 hours to obtain alumina powder coated with 0.1 part of $SiO_2$.

In the same manner as in Example 1 but using the above $SiO_2$-coated alumina powder (average primary particle size: 0.2 μm), a magnetic recording tape was produced. The characteristics of the tape are shown in Table 1.

In Table 1, the contamination of head is evaluated according to following criteria:
A: Good
B: Fair
C: Poor
D: Bad

TABLE 1

| | Properties of alumina powder | | | Characteristics of magnetic tape | | | |
| --- | --- | --- | --- | --- | --- | --- | --- |
| Example No. | Oxide | Oxide content (parts) | Av. primary particle size (μm) | Surface gloss | Still characteristic (min.) | Head contamination | Abrased amount of head (μm/100 hr) |
| 1 | $SiO_2$ | 0.1 | 0.2 | 105 | >90 | A | 5 |
| 2 | ↑ | 1.0 | 0.12 | 103 | >90 | A | 4 |
| 3 | MgO | 0.4 | 0.12 | 106 | >90 | A | 5 |
| 4 | $La_2O_3$ | 4.0 | 0.2 | 107 | >90 | B | 5 |
| 5 | $ZrO_2$ | 4.0 | 0.2 | 109 | >90 | B | 4 |

TABLE 1-continued

| | Properties of alumina powder | | | Characteristics of magnetic tape | | | |
|---|---|---|---|---|---|---|---|
| Example No. | Oxide | Oxide content (parts) | Av. primary particle size (μm) | Surface gloss | Still character- istic (min.) | Head contamin- ation | Abrased amount of head (μm/100 hr) |
| 6 | MgO | 0.4 | 0.2 | 105 | >90 | A | 5 |
| 7 | MgO | 0.4 | 0.2 | 103 | >90 | A | 4 |
| Comp. 1 | — | — | 0.2 | 103 | 40 | D | 3 |
| Comp. 2 | SiO$_2$ | 0.1 | 0.4 | 86 | 60 | A | 15 |
| Comp. 3 | ↑ | 7 | 0.2 | 103 | 60 | D | 2 |
| Comp. 4 | ↑ | 0.03 | 0.2 | 104 | 40 | C | 2 |
| Comp. 5 | ↑ | 0.1* | 0.2 | 102 | 50 | D | 2 |

Note:
*Coated amount.

TABLE 2

| Example No. | Additive | Calcination Temp. (°C.) |
|---|---|---|
| 2 | Ethyl silicate | 1300 |
| 3 | Magnesium nitrate | 1200 |
| 4 | Lanthanum nitrate | 1300 |
| 5 | Zirconium n-butoxide | 1250 |
| 6 | Magnesium oxide (particle size: 0.01 μm) | 1250 |
| 7 | Magnesium nitrate | 1250 |
| Comp. 1 | None | 1200 |
| Comp. 2 | Ethyl silicate | 1300 |
| Comp. 3 | ↑ | 1400 |
| Comp. 4 | ↑ | 1230 |

What is claimed is:

1. A magnetic recording medium, comprising a nonmagnetic substrate and a magnetic layer which comprises magnetic powder, a binder, and alumina powder having an average primary particle size of not larger than 0.3 μm, wherein said alumina powder contains at least one oxide selected from the group consisting of oxides of silicon, magnesium, lanthanum and zirconium in an amount of 0.05 to 5 parts by weight per 100 parts by weight of alumina, and wherein said alumina powder is obtained by one of the following methods:
(1) homogeneously mixing a compound which can be converted to said oxide in a solution of an aluminum salt, forming an aluminum compound through neutralization, and calcining said aluminum compound at a temperature of 1100° to 1400° C., wherein the amount of said compound which can be converted to said oxide is from 0.05 to 5 parts by weight based on the amount of said oxide per 100 parts by weight of said aluminum salt based on the amount of said alumina;
(2) homogeneously mixing a compound which can be converted to said oxide in a solution of an organoaluminum compound, forming an aluminum compound through hydrolysis, and sintering said aluminum compound at a temperature of 1100° to 1400° C., wherein the amount of said compound which can be converted to said oxide is from 0.05 to 5 parts by weight based on the amount of said oxide per 100 parts by weight of said organoaluminum compound based on the amount of said alumina; or
(3) mixing a compound which can be converted to said oxide with an aluminum compound which has been prepared from an aluminum salt by a neutralization method or a recrystallization method, or by precipitating an aluminum compound as a carbonate or an aluminum compound which has been prepared by hydrolyzing an organoaluminum compound, in a dry or wet state, and calcining said aluminum compound at a temperature of 1100° to 1400° C., wherein the amount of said amount which can be converted to said oxide is from 0.05 to 5 parts by weight based on the amount of said oxide per 100 parts by weight of said organoaluminum compound based on the amount of said alumina.

2. The magnetic recording medium according to claim 1, wherein the amount of said oxide is from 0.07 to 4 parts by weight per 100 parts by weight of alumina.

3. The magnetic recording medium according to claim 1, wherein said average primary particle size of said alumina powder is from 0.05 to 0.25 μm.

4. The magnetic recording medium according to claim 1, wherein the amount of said alumina powder in said magnetic layer is from 0.1 to 15% by weight based on the weight of said magnetic powder.

5. A magnetic recording medium, comprising a nonmagnetic substrate and a magnetic layer which comprises magnetic powder, a binder, and alumina powder having an average primary particle size of not larger than 0.3 μm, wherein said alumina powder contains at least one oxide selected from the group consisting of oxides of silicon, magnesium, lanthanum and zirconium in an amount of 0.05 to 5 parts by weight per 100 parts by weight of alumina, and wherein said oxide is present in the crystal of said alumina either dispersed or in the solid solution state.

6. The magnetic recording medium according to claim 5, wherein the amount of said oxide is from 0.07 to 4 parts by weight per 100 parts by weight of alumina.

7. The magnetic recording medium according to claim 5, wherein said alumina powder is obtained by homogeneously mixing a compound which can be converted to said oxide through calcination in a solution of an aluminum salt, forming an aluminum compound through neutralization, recrystallization or precipitation of aluminum carbonate with ammonium hydrogen carbonate and calcination.

8. The magnetic recording medium according to claim 5, wherein said alumina powder is obtained by homogeneously mixing a compound which can be converted to said oxide through calcination in a solution of organoaluminum salt, forming an aluminum compound through hydrolysis and sintering said aluminum compound.

9. The magnetic recording medium according to claim 5, wherein said alumina powder is obtained by mixing a compound which can be converted to the oxide through calcination with an aluminum compound which has been prepared from an aluminum salt by a neutralization method or a recrystallization method, or by precipitating an aluminum compound as a carbonate or an aluminum compound which has been prepared by hydroylyzing an organoaluminum compound in a dry or wet state and then calcining said aluminum compound.

10. The magnetic recording medium according to claim 5, wherein said average primary particle size of said alumina powder is from 0.05 to 0.25 μm.

11. The magnetic recording medium according to claim 5, wherein the amount of said alumina powder in said magnetic layer is from 0.1 to 15% by weight based on the weight of said magnetic powder.

* * * * *